Sept. 14, 1937.  F. CUÉNOUD  2,092,957
PRINTING DEVICE APPLICABLE TO WEIGHING APPARATUS
Filed March 26, 1936  2 Sheets-Sheet 1
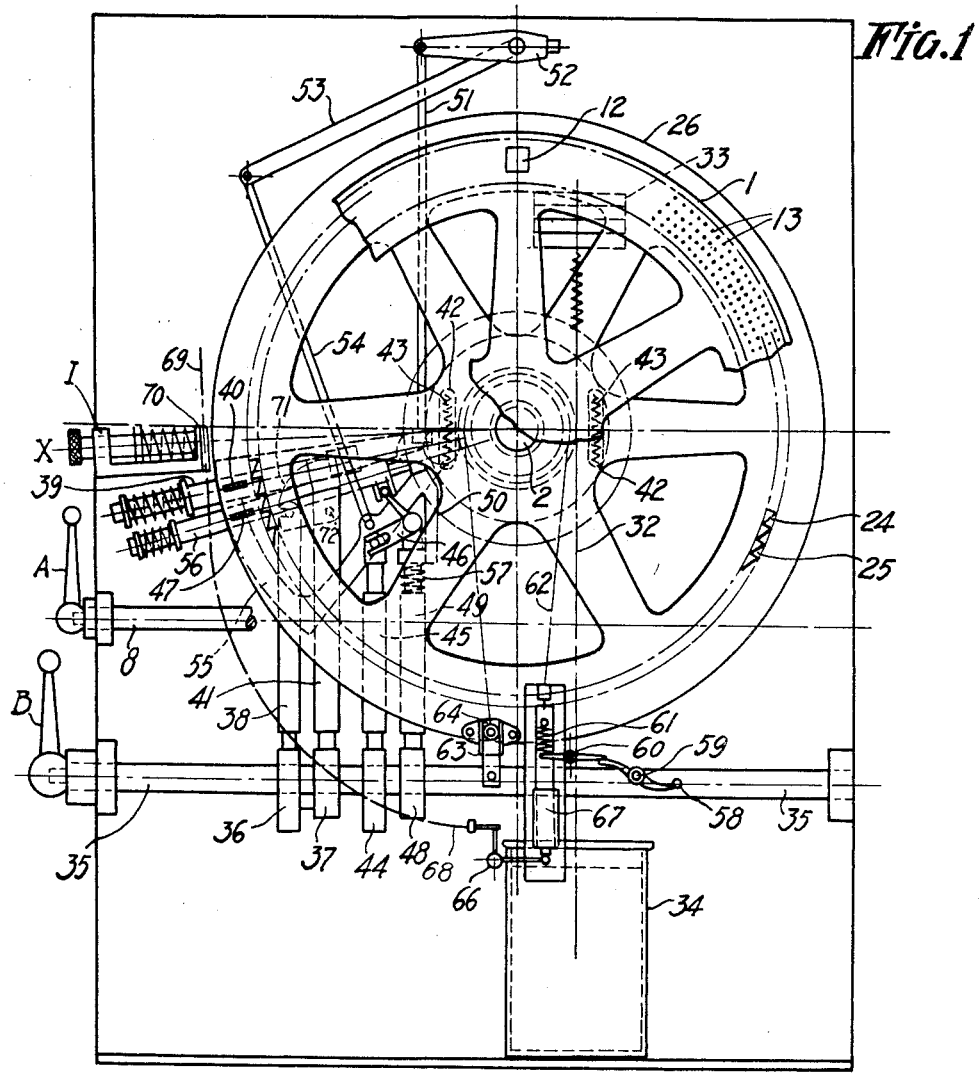
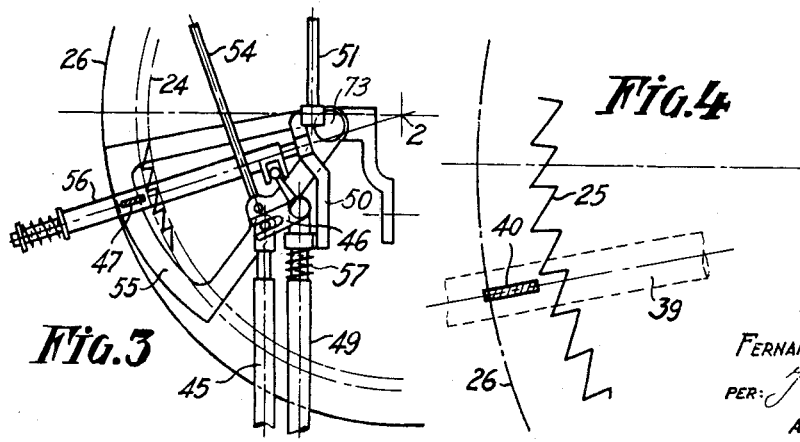
INVENTOR:
FERNAND CUÉNOUD
PER: *J. Severn*
ATTORNEY.

Sept. 14, 1937.   F. CUÉNOUD   2,092,957
PRINTING DEVICE APPLICABLE TO WEIGHING APPARATUS
Filed March 26, 1936   2 Sheets-Sheet 2
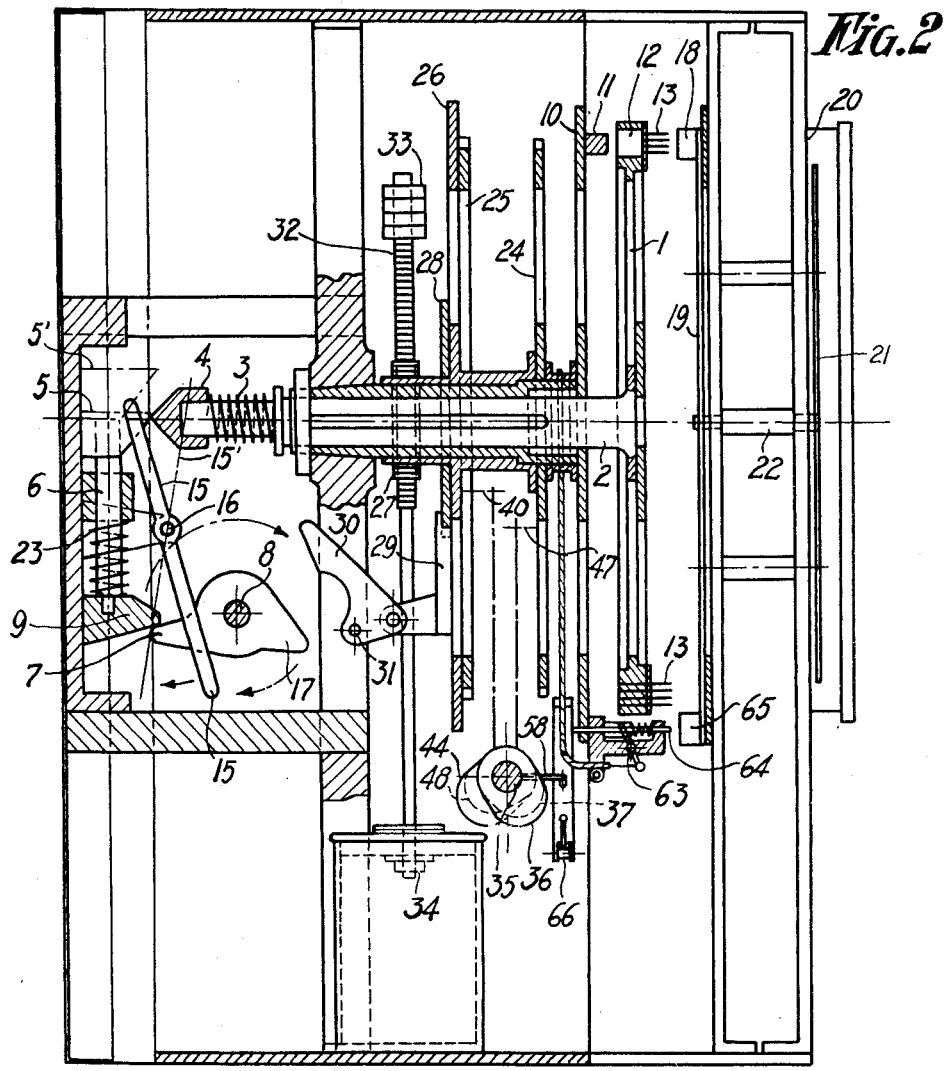
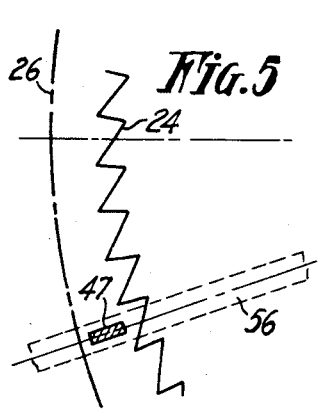
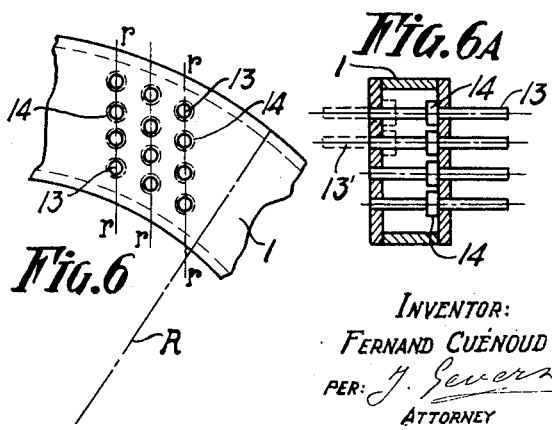
INVENTOR:
FERNAND CUÉNOUD
PER: [signature]
ATTORNEY Patented Sept. 14, 1937

2,092,957

UNITED STATES PATENT OFFICE 2,092,957

PRINTING DEVICE APPLICABLE TO WEIGHING APPARATUS

Fernand Cuénoud, Tourcoing, France

Application March 26, 1936, Serial No. 71,055, In France March 28, 1935

2 Claims. (Cl. 265—5)

The present invention relates to an apparatus applicable to weighing apparatus and useful for printing with accuracy the weight indicated by the pointer or indicator of such apparatus.

The invention consists in the combination with an indicator or pointer of a weighing apparatus, of a control lever moved by said indicator, projections at each end of said lever, a disc mounted upon an axially movable shaft, a circular set of axially movable pins on said disc, said pins facing one projection of said lever, a rotary block mounted on said shaft comprising a disc with a projection adapted to abut the pins protruding at the adjacent side of the first-mentioned disc under the action of the aforesaid projection, a type wheel and stepped discs; a type sector, manually operated means engaging the steps of said discs, means to rotate the block and the sector, manually operated means for axially moving the shaft, a printing device and a feeler mechanism cooperating with the second projection of the aforesaid lever adapted to insert a shutter preventing the printing operation.

Further characteristic features will appear from the description hereafter.

In the accompanying drawings, a form of embodiment of the apparatus has been illustrated and will be described hereafter.

Fig. 1 is a front elevation showing the main elements of the mechanical embodiment of the invention.

Fig. 2 is a side view with partial section, of the apparatus.

Fig. 3 is a front elevation of the device showing the setting mechanism for the printing of lower denomination numerals.

Figs. 4 and 5 show, on enlarged scale, certain details such as the discs securing the precise printing position of the higher and lower denomination numerals.

Figs. 6 and 6a illustrate, on enlarged scale, in front view and in transverse section, the arrangement of the stopping pins determining the weight value to be printed.

With reference to the apparatus illustrated in Figs. 1 to 6, the device comprises a disc 1 supporting a circular set of stopping pins, said disc being fixed to a shaft 2, to which only an axial reciprocating movement can be imparted. This shaft 2 is provided, at its end opposite to the disc 1, with a spring 3 securing the normal inoperative position of the disc, and with a conical head 4 abutting against a stop 5, which has a downwardly extending slidable rod 6, arranged for guiding a vertical reciprocating movement of said stop 5. A cam 7, mounted upon a rotary shaft 8, is provided for causing a lifting movement of the stop 5, provided with a sloping face, such movement being produced by means of the slidable projection 9, and the lifting of the abutment 5 enables the disc 1 to enter into contact with a disc 10, provided with a projection 11 adapted to penetrate into a port 12 of the disc 1. This rearward movement of the disc 1 has for effect to cause all the stopping pins 13 to be pushed at their rear end, so as to protrude from the front side of the disc 1. These stopping pins 13 are arranged in the required number and positions on lines r with respect to the radius R of the disc 1, as clearly illustrated in Figs. 6 and 6a, and these pins are mounted in conveniently arranged bores, whereas their axial movement is limited by a collar provided in the medium portion of their length.

When the disc 1 has been brought into contact with the disc 10, a swinging lever 15, pivoted in 16, is moved by the ridge 17 of the cam 7 and pushes the disc 1, so as to cause a number of stopping pins 13 to come into contact with the projection 18 of a lever 19, and this has for effect to cause one or more stopping pins 13, facing the projection 18, to be shifted rearwards, as illustrated in dotted lines 13' in Fig. 6a. This counterpointer or lever 19 is in close relation with a weighing apparatus having a dial 20 and an indicator or pointer 21, the pivot spindle 22 of which is connected to the lever 19.

During the forward movement of the disc 1, under the pushing action of the lever 15, moved in the position 15', the abutment with sloping face 5, which occupied the position 5', will have resumed its original position, under the action of a return spring 23, which had been compressed by the foregoing movement.

It may be seen that, under these conditions, the angular movement of the pointer or index 21 indicating the weight at the weighing apparatus, will be exactly reproduced by the lever 19. When the shaft 8 is further rotated, the ridge 17 of the cam 7 releases the lever 15 and therefrom results that the disc 1 resumes its normal rest position against the abutment 5. At this moment, one at least of the stopping pins 13 has been pushed so as to project at the rear side of the disc 1, so as to form a stopping element for the printing system as will be shown hereafter. This stopping pin is exactly in front of the projection 18 of the lever 19, so that it corresponds accurately with the position of the end of the pointer 21 indicating the weight recorded on the dial 20.

An assemblage mounted on the shaft 2, behind the disc 1, is constituted with the disc 10 provided with the projection 11, with two stepped wheels 24 and 25, a type wheel 26, a pinion 27 and an end plate 28, provided with a notch to be engaged by a locking latch 29 for securing the normal inoperative position of the block thus formed.

The wheels 25 and 26 integral with each other have a determined rotary clearance, corresponding for instance to the space between two steps of 25, with respect to the stepped wheel 24 which is integral with the disc 10. A spring 43 fixed at 42 to the wheel 24 acts to bring the wheel 25 in a normal limit position.

When the shaft 8 is rotated further on, the ridge of the cam 7 will engage the lever 30, pivoted at 31, and the movement of the latter will remove the latch 29 from the notch of the disc 28, so that the aforesaid assemblage will be released and a rotary movement will be imparted thereto by the pinion 27, driven by a rack-bar 32, which is provided with a counterweight 33, and this movement is slowed down or braked by means of a damping device 34. The assemblage will rotate until the projection 11 will come into contact with the pin or pins 13 projecting at the rear side of the disc 1.

The movements which have been described herebefore have for effect to move the assemblage 10, 24, 25, 26, 27 and 28 over an angle exactly equal to that over which the pointer 21 of the weighing apparatus has moved and, as a consequence, the higher denomination numeral of the type wheel 26 will have been brought to the printing position corresponding exactly to that indicated by the pointer 21.

As it may occur that the numeral to be printed is not exactly in front of the actual printing position with respect to the printing device, for instance according to the axis X (Fig. 1), use is made, for securing this accurate position, of the following means:

Upon a shaft 35 are arranged twin cams 36 and 37, the shape of which is such that 37, during its rotation, lifts a rod 41 for actuating a lever 39 which rotating about the shaft 2 constitutes a guide for a clamping peg 40 adapted to engage a convenient step of the stepped wheel 25, which is juxtaposed thereto. This peg 40 is for instance formed by a simple projection upon a tube slidable upon the lever 39. At this moment, the peg 40 occupies a position in front of the step, but the cam 36 lifting the rod 38 over a convenient distance, causes the peg 40 to engage the step and enter into contact with the side wall of the step, under the action of a crank lever 71 pivoted at 72 upon the rod 41. Owing to the play left to the stepped disc 25 by the springs 43, the driving in of the peg 40 up to the bottom of the indentation causes the type wheel 26 to take the required printing position, which means that the higher denomination numerals will be exactly within the axis X.

A device for setting the lower denomination numerals in the printing position has been designed and works as follows:

A cam 48 fixed upon the shaft 35 lifts the rod 49, which, by means of the spring 57 and the pusher 50, moves a lever system 51, 52, 53, the free end of which is connected to a rod 54 adapted to lift the sector 55, the periphery of which is provided with the lower denomination numerals. This sector 55 pivoted at 73 offset the axis 2 has an angular displacement controlled by a clamping peg 47, similar to that 40 and actuated by the cam 48 fixed upon the shaft 35 and the rod 45 which moves the crank lever 46 pivoted at the end of the rod 49. The lifting of the sector 55 is continued until the moment when the peg 47 abuts against the corresponding step of the wheel 24, so that it comes accurately to the required position for bringing the lower denomination numerals in front of the printing device.

The upward movement of the lever 56 and the sliding movement of the peg 47 are thus limited by the abutment of said peg at a point off the side edge of the step which has been brought in a determined position under the load put on the weighing apparatus. The angular movement of the sector 55 is necessarily proportioned to the length of the side edge of the steps.

The stopping of the wheel 24 is determined by the projection 11 of the disc 10, which comes into contact with the rearwardly projecting stopping pin 13, but from this stopping moment, the spring 57 of the rod 49 will compensate the possible difference for bringing the higher and lower denomination numerals to the strictly accurate printing positions.

It should be noticed that, in the apparatus illustrated in the accompanying drawings and described, the stopping pins 13 are ten in number for the value given to a step of the wheel 24 similar to that shown in 25.

Means are provided for controlling the accuracy of the apparatus.

For preventing all mistakes which may result from any cause whatever, a device has been provided preventing the printing from being performed when there is no exact similitude between the position of the pointer of the weighing apparatus and that of the printing mechanism.

For this purpose, the shaft 35 has been provided with a pin 58, which, just before the printing moment, actuates a lever pivoted at 59; this lever actuates another lever 60, engaging a spring 61 one end of which is fixed to a latch 67. The spring 61 pulls upon a flexible connection 62 adapted to move a slidable peg 64 by means of another pivoted lever 63.

The elements 60 and 61 are attached to a fixed portion of the device, whereas the elements 62, 63 and 64 are connected to the disc 10 supporting the projection 11 and thus rotate with said disc 10. The slidable pin 64 is in a position diametrically opposite to that of the projection 11. Such movement is made possible by passing the flexible cable 62 over the hub of the disc 10 and causing the rotation of said disc in the convenient direction for unfolding the loop thus formed in the cable 62.

The lever 19, provided at one end with a projection 18, is also provided, at the opposite end, with another projection 65, and when the assemblage, formed by the united elements 10, 24, 25, 26, 27 and 28, rotates and when it will be stopped by the abutment of the projection 11 against the rearwardly projecting stopping pin 13, the peg 64 will be exactly in front of the projection 65. Just at this moment, the pin 58 will act on the flexible coupling 62 and actuate the peg or feeler 64.

When the printing position is accurately secured, the feeler 64 abuts against the projection 65 and nothing prevents the printing from being performed. Indeed, in this locked position, the flexible coupling being prevented from operating, the lever 60 will pull upon the spring 61, without the latch 67 being influenced and the printing mechanism I can be normally operated. When, on the contrary, the feeler 64 is not in front of projection 65, the printing position is not conformable to that of the pointer 21, and in this case, the lever 60 pulls on the latch 67, actuates the crank lever 66, and the flexible coupling 68 will be pulled by the lever 66, and from this will result that the swinging shutter 69 will be moved so as to become inserted between the type wheel 26 and sector 55 and the printing device 70.

It results from the foregoing, that, in the printing operation, the exact numerals corresponding to the movement of the pointer 21 of the weighing apparatus will have been printed when the mechanism of the device has worked in a regular manner, but if not, the printing will not be recorded.

It may be said, that the apparatus as described may be provided, if necessary, with all auxiliary mechanisms of known construction, for instance such as a computing device, a price-indicator and like mechanisms.

The apparatus works as follows:

Assuming that this apparatus is united to a weighing instrument illustrated in the drawings (Fig. 2) only by its dial 20 and its indicator 21, this device, when a weighing operation is performed, will have the pointer 21 oscillated until it stops at the indication of the dial 20 which corresponds exactly to the weight of the article under consideration.

The shaft of the disc 1 is in alinement with the axis of the pivot 22 which unites the pointer 21 and the lever 19.

When now the shaft 8 is rotated by means of the handle A, the cam secured on this shaft will lift the abutment 5 to 5', and this will cause the rearward shifting movement of the disc 1, so that it comes into contact with the disc 10 for causing the stopping pins 13 to project forwardly. Then this cam, when rotated further on, will actuate the lever 15, so as to bring it in position 15', for shifting the disc 1 forward, towards the lever 19, the projection 18 of which will push backwards one or more of the stopping pins 13 facing said projection. When further rotated, the same cam 8 will release the lever 15, so as to enable the disc 1 to resume its original position, under the action of the spring 3, and the said cam finally will abut against the lever 30, said lever pivoting about 31, unlocking the disc 28 by lowering the latch 29. This has for effect to release the assemblage 10, 24, 25, 26, 27 and 28, which will then be rotated by the rack 32, said rotation being continued until the projection 11 abuts the stopping pin 13 which has been previously pushed rearwards so as to project from the disc 1.

When the assemblage will have assumed its stopping position, the handle B of the shaft 35 will be actuated, and the cams 36 and 37 will secure the printing position of the type wheel 26 for printing the higher denomination numerals, whereas the cams 44 and 48, by means of the elements described herebefore, will secure the position of the sector 55 supporting the lower denomination numerals.

The permanent position of the numerals will thus be secured by the stepped wheels 25 and 24 and the regulating pegs, as described herebefore.

The handle B being rotated further on, the pin 58 will produce the effect intended by the elements 59, 60, 61, 62 and 63, so as to enable the printing to be performed only when there is an absolute accuracy between the feeler 64 and the projection 65. In the other case, however, namely when the feeler 64 is not in front of the abutment 65, the mechanism will operate under the effect of the element 67, to move a lever 66 acting against the flexible connection 68 and this flexible connection will move a swinging shutter or the like to become inserted between the type wheels and the printing apparatus 70, so that the printing operation cannot be performed.

I claim:

1. In apparatus of the character described, the combination with an indicator of a weighing apparatus, of a control lever moved by said indicator, projections at each end of said lever, a disc mounted upon an axially movable shaft, a circular set of axially movable pins on said disc, said pins facing one projection of said lever, a rotary assemblage member mounted on said shaft comprising a disc with a projection adapted to abut the pins protruding at the adjacent side of the first-mentioned disc under the action of the aforesaid projection, a type wheel, and stepped discs; a type sector manually operated means engaging the steps of said discs, means to rotate the assemblage member and the sector, manually operated means for axially moving the shaft, a printing device and a feeler mechanism cooperating with the second projection of the aforesaid lever adapted to insert a shutter preventing the printing operation.

2. In apparatus of the character described, the combination with an indicator of a weighing apparatus, of a control lever moved by said indicator, projections at each end of said lever, a disc mounted upon an axially movable shaft, a circular set of axially movable pins on said disc, said pins facing one projection of said lever, a rotary assemblage member mounted on said shaft comprising a disc with a projection adapted to abut the pins protruding at the adjacent side of the first-mentioned disc under the action of the aforesaid projection, a type wheel, and stepped discs; a type sector manually operated means engaging the steps of said discs, a rack-and-pinion drive for rotating the assemblage member, a manually operable locking means controlling the assemblage member, a cam and lever drive for moving the type sector, manually operated means for axially moving the shaft, a printing device and a manually operable feeler mechanism cooperating with the second projection of the aforesaid lever adapted to insert a shutter preventing the printing operation.

FERNAND CUÉNOUD.